United States Patent [19]

Dunkers

[11] Patent Number: 5,252,230
[45] Date of Patent: Oct. 12, 1993

[54] GRANULATED FILTER FOR THE FILTRATION OF FINE GRADED SUSPENSIONS

[76] Inventor: Karl Dunkers, Hastskovagen 7, S-183 50 Taby, Sweden

[21] Appl. No.: 965,529

[22] Filed: Oct. 23, 1992

Related U.S. Application Data

[63] Continuation of Ser. No. 802,182, Dec. 4, 1991, abandoned.

[30] Foreign Application Priority Data

Oct. 25, 1991 [SE] Sweden .................................. 9103118

[51] Int. Cl.$^5$ ............................................. B01D 24/46
[52] U.S. Cl. .................................. 210/792; 210/274; 210/284
[58] Field of Search ............... 210/189, 268, 269, 274, 210/284, 792

[56] References Cited

U.S. PATENT DOCUMENTS

| | | | |
|---|---|---|---|
| 3,537,582 | 3/1967 | Demeter | 210/189 |
| 3,897,339 | 7/1975 | Arndt | 210/283 |
| 4,021,339 | 5/1977 | Foody | 210/274 |
| 4,126,546 | 11/1978 | Hjelmner et al. | 210/793 |

FOREIGN PATENT DOCUMENTS

0291538 11/1990 European Pat. Off. .
378361 9/1975 Sweden .

*Primary Examiner*—Ivars Cintins
*Attorney, Agent, or Firm*—Oliff & Berridge

[57] ABSTRACT

A granular filter is arranged for filtration of suspensions where the flow through the bed is horizontal. The bed depth is less than about 12 cm and the media particle size is less than about 0.6 mm. Pollutants trapped by the media particles are removed by a washing device capable of operation during the filtration process.

8 Claims, 3 Drawing Sheets

GRANULATED FILTER FOR THE FILTRATION OF FINE GRADED SUSPENSIONS

This is a continuation of application Ser. No. 07/802,182 filed Dec. 4, 1991, now abandoned.

BACKGROUND OF THE INVENTION

This invention relates to a granulated filter having the capability for removal of very fine particles from suspensions. The filter is characterized partly by the efficiency in reusing the filter media through a backwash operation and partly by the favorable economy due to an extreme low filter bed depth.

Recent environmental requirements are leading the developments of new filtration technology towards the task of fine particle removal within the municipal sewage treatment field and the industrial wastewater treatment field as well.

The existing technique for filtration of fine particles is mainly based on membrane filters and/or cartridges. While the cartridges may have small particle sizes and low filter bed depths, the filter media can not be backwashed in regular sequences, they have low flow capacities and they can not be arranged for large-scale installations within reasonable investment cost limits.

Other filters in the market are those with granular filter beds. The filter media are usually sand in different mesh sizes, anthracite, dolomite, activated carbon, etc. These filter beds can mostly be arranged for backwashing either in sequences or continuously. The filter beds can be loaded with much higher flow rates than what is possible for the membrane and cartridge filters. Consequently, the granular filters are more economical due to the operation costs and investment costs as well. However, a substantial disadvantage is the fact that existing granular washable beds cannot be arranged for filtration of fine-particles. The physics of the granular beds, the filter arrangement itself and the washing procedure do not make the filtration of fine particles possible.

SUMMARY OF THE INVENTION

Filter techniques in accordance with this invention will make it possible to achieve excellent fine-particle filtration efforts in washable beds without having the above mentioned disadvantages regarding membrane/cartridge filters and conventional granular filter beds as well.

This invention refers to a granular filter bed where the particle size is smaller than about 0.6 mm (600 microns) and where the filter bed depth —in the flow direction— is less than about 12 cm. In a preferred application of this filter, the filter bed is encased between two mainly vertical and permeable walls. The suspension to be filtered is forced to flow mainly horizontally through the filter bed.

When decreasing the particle size in filter beds, the hydraulic loss of head will increase exponentially. Therefore, if fine bed particles, less than about 0.6 mm (600 microns) were used in conventional filter beds, then the hydraulic flow capacity would be extremely low. Consequently, in fine-particle filter beds it is necessary to decrease the bed depth down to values which are small enough to avoid unreasonable high hydraulic loss of head due to filter resistance.

Filter bed tests with this technique have shown that the depth in fine-particle beds can be decreased down to less than about 12 cm, even to ranges in order of 4–10 cm, while still maintaining an excellent filtration capacity as to filtered suspension particles. On the other hand, it is necessary to increase the filter area substantially in comparison with conventional filter beds.

The filtration capacity in this invention is further improved by the horizontal flow through the filter bed. Several standardized vertical filter modules arranged in lines close to each other provides a favorable filter plant total capacity at relatively low specific costs.

Horizontal flow through filter beds is known before, for example in the Patents No. EP 291 538 and SE 378 361. These patents are dealing with sand filters having conventional particle sizes and conventional filter bed depths as well. Therefore, these filters are limited to applications only where conventional suspension particle sizes are to be removed, but they are not applicable within the defined technical fields of microfiltration, ultrafiltration or membrane filtration.

BRIEF DESCRIPTION OF THE DRAWINGS

This invention is characterized by the attached claims and it is further illustrated in the attached figures, wherein:

DETAILED DESCRIPTION OF THE PREFERRED EMBODIMENTS

Figure 1:
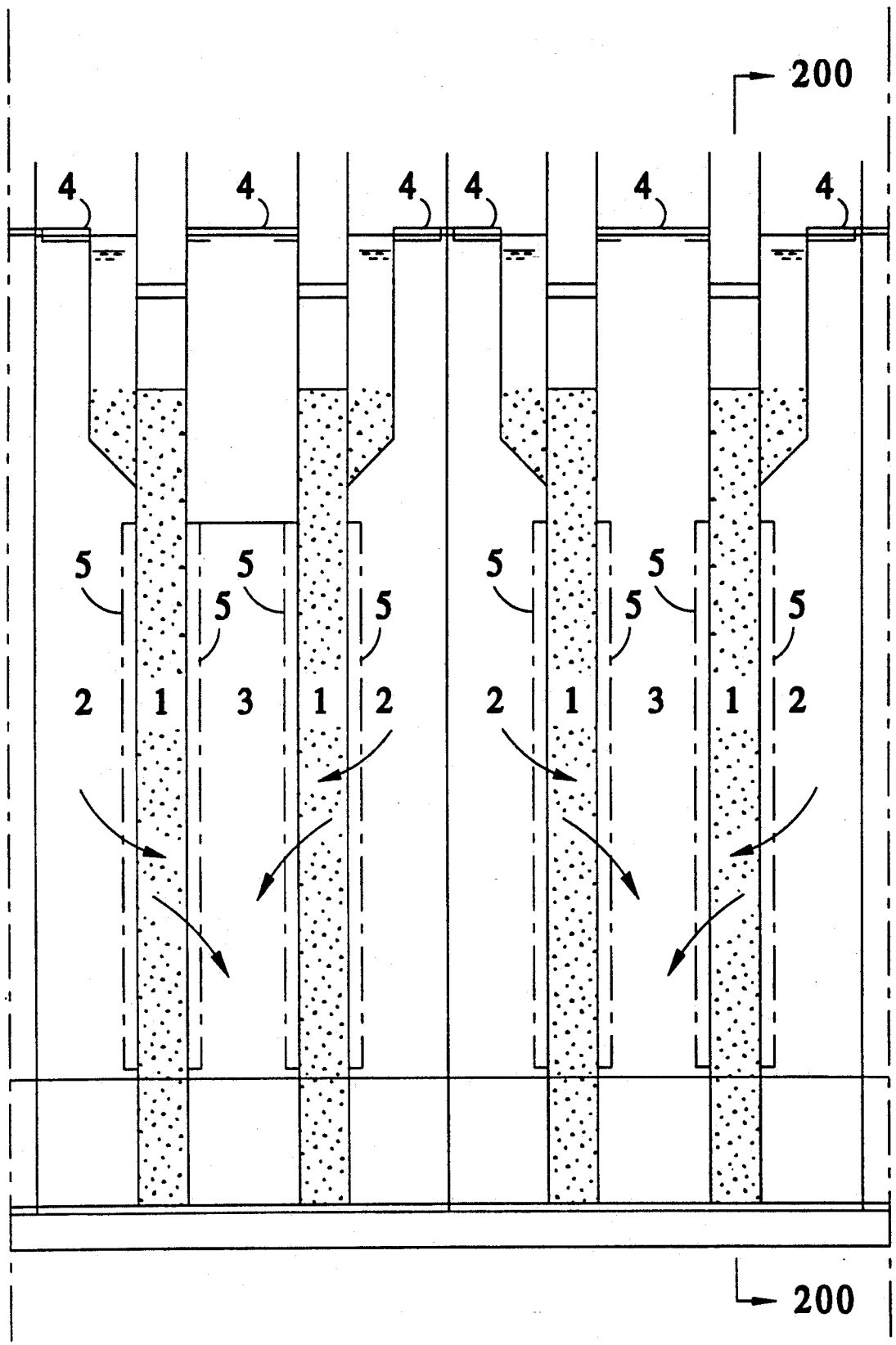
FIG. 1 is a side view of the inventive granulated filter.

FIG. 1 shows an elevation through a group of filters beds (1) arranged mainly in vertical position and parallel to each other. This arrangement represents a preferred application of the invention.

On one side of each filter bed (1) is the inlet chamber (2), where the inlet suspension having pollutants therein will be fed. On the other side is the outlet chamber (3), where the filtered solution (the filtrate) is collected. According to FIG. 1, each outlet chamber (3) is serving two filter beds (1) on both sides. Each bed (1) is fed with inlet suspension from the adjacent inlet chamber (2). This arrangement improves the filtration efficiency due to the decreased flow velocity on the inlet side. All inlet and outlet chambers are closed by top covers (4) which enable each chamber to be under a certain desirable overpressure during operation and/or washing sequences.

The filter media consists of either sand or any of the above mentioned granular filter media. According to this invention, the particle size should however not exceed about 0.6 mm (600 microns). Preferably it shall be within the range of 0.05 to 0.50 mm. This range has been noticed in tests as the optimum, which means highest possible fine-particle filtration efficiency at lowest loss of head and lowest washwater consumption.

Referring to FIG. 1, the filter bed depth is defined as the horizontal distance the suspension has to flow through the bed (1). In order to achieve the highest possible filtration flow capacity and filtration removal capacity as well, the bed depth has to be selected in a certain relation to the particle size of the filter media. Consequently, at filtration of normal fine-particle suspensions, the bed depth shall preferably be in the range of about 6 to 10 cm when using bed particles within the range of about 0.1 to 0.5 mm.

The mainly parallel intermediate walls which surround the filter bed are equipped with flow-through openings (5) covered with permeable fabric supported by a perforated steel plate and/or netting wire. The permeable fabric shall be tight enough for avoiding any escape of the granular filter bed media.

Figure 2:
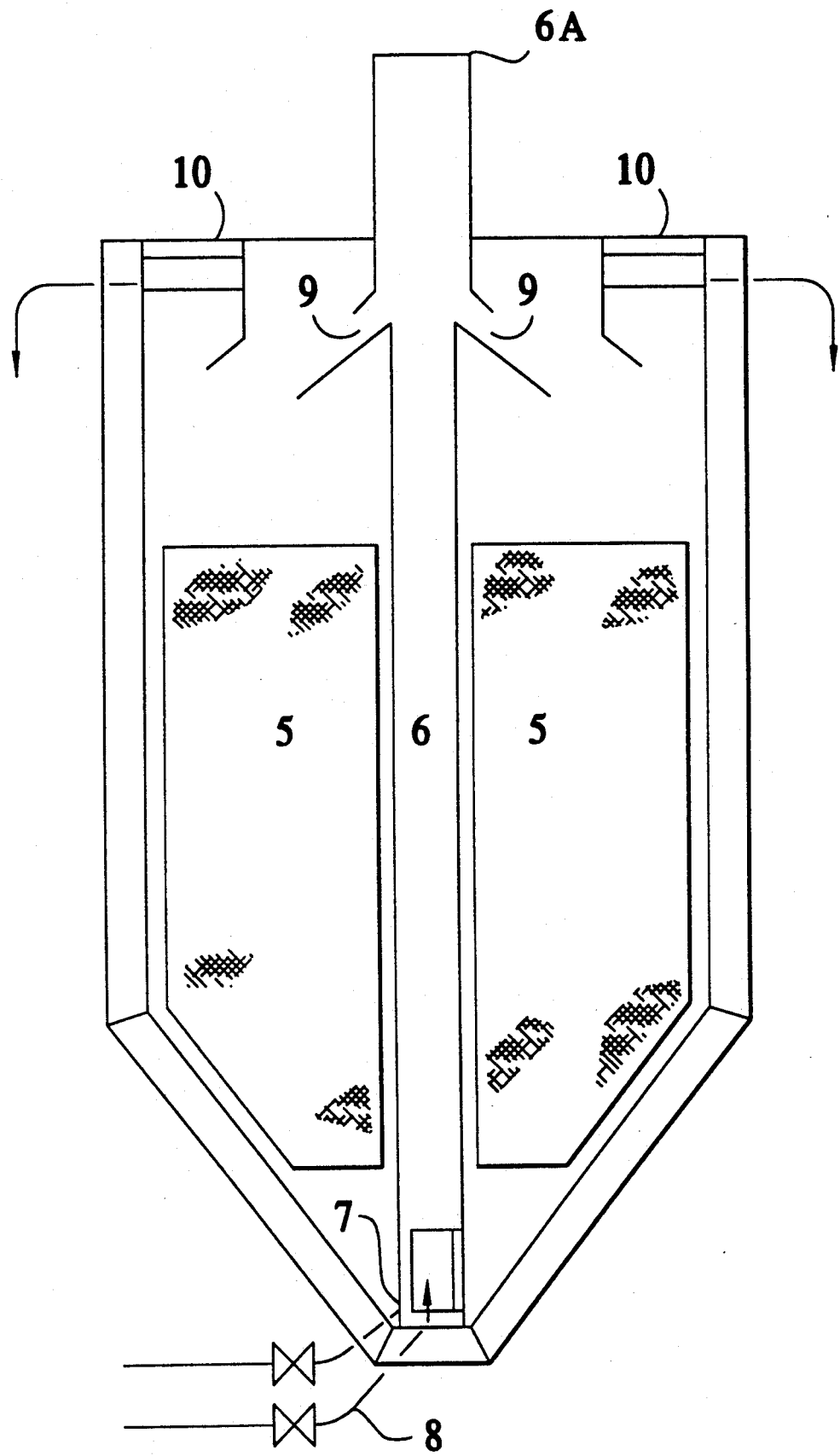
FIG. 2 is a vertical cross-sectional view of the filter of FIG. 1 taken along the line 200—200 of FIG. 1.

FIG. 2 shows a cross section through the filter bed (1) with the flow-through openings (5) including the fabrics and the supporting plates and nets. FIG. 2 further illustrates one possible way for washing the bed media. An air lift pipe (6) communicates with the filter bed (1) and transports the filter bed media from the bottom to the top. The washwater is pumped through nozzles (7) into a base of the lift pipe (6). The transporting action is caused by feed of compressed air through pipes (8) into the base of the air lift pipe (6). During this pumping and transportation action, the filter media is thoroughly washed. After being washed in the air lift pipe (6), the bed media is equally distributed over the bed surface by means of openings (9). Any air bubbles will discharge upwards through the open end (6A) of the pipe (6) located in an extension of the pipe above the opening (9). The washed pollutants (the reject) will rise with the washwater stream toward the surface, be withdrawn through overflow weir channels (10) and then discharged from the system. The washing system can be arranged for either continuous or intermittent operation. That is, the washing apparatus can operate when the suspension is flowing in the flow direction for filtering or when the flow of suspension is interrupted.

Other additional washing devices can be arranged in the filter. For instance, the permeable fabric on the inlet chamber side can be separately rinsed by means of fixed rinsewater nozzles fed by a separate pipe/valve system.

Backwashing of the filter bed and fabrics can take place simultaneously or separately with the above mentioned fabric rinsing with nozzles. The backwashing is done with a flow of backwashwater from the outlet chamber (3) through the bed and into the inlet chamber (2) for further discharge. The backwashwater has to be fed at a sufficient overpressure. This backwashing system needs corresponding pipes and valves. For the nozzle rinsing of fabrics and the fabric backwashing, the filter operation has to be shut off. However, during the washing through the air lift pipe, the regular filter operation can go on.

Figure 3:
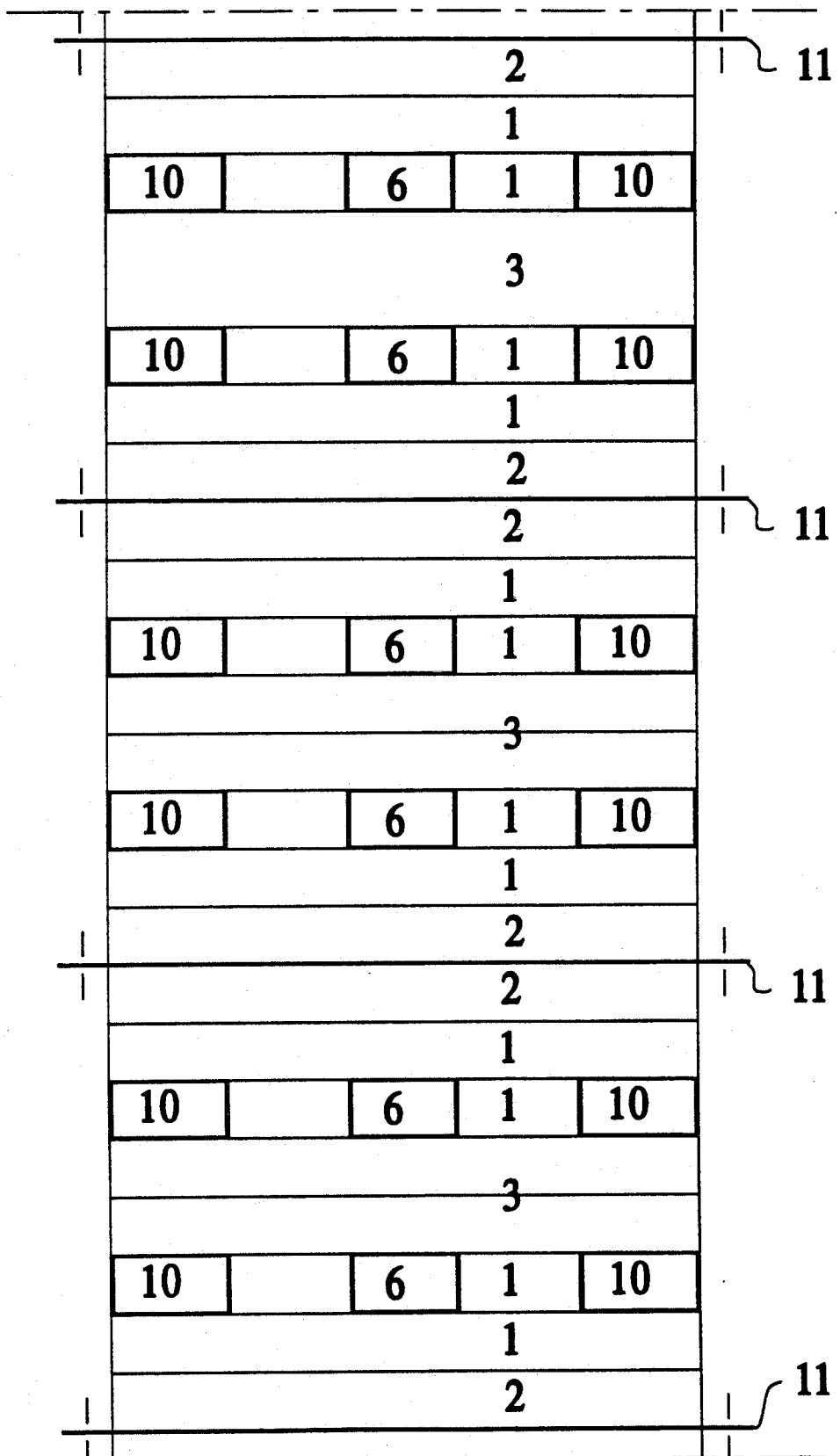
FIG. 3 is a top view of the filter.

FIG. 3 shows a top view with the filter beds (1), the inlet chambers (2) and the outlet chambers (3), all arranged in modules in one line close to each other. The air lift pipe (6) is here illustrated with a rectangular cross section. It can however be alternatively made with a circular cross-section. FIG. 3 further illustrates the overflow weir channels (10) where the air lift washwater will be discharged. According to FIG. 3, the filter modules are coupled by means of bolts and flanges (11). Each module consists of two beds (1), two inlet chambers (2) and one outlet chamber (3). The amount of individual modules and amounts of module rows form together the size and capacity of the filtration plant. The auxiliary equipment, consisting of pipes, valves, switches, timers, etc. can be installed close to each module.

The narrow spaced and vertically arranged filter bed system gives an optimized total filter area on a certain available volume. This filter system does not have any limitations as to unit dimensions. It can therefore be installed even for very large-scale plants operating for microfiltration and ultrafiltration as well.

This fine granular filter system is suitable for several applications as the final or polishing stage for use in industrial wastewater, drinking water, sewage water, lake water and stormwater treatment plants. The pilot plant test results obtained are excellent, indicating a phosphorous and suspended solids removal of 80–90%, bacteria removal of 62% and algae mass and chlorophyll A removal of 75% for a bed depth of 4 cm and a particle size of about 0.0 to 0.5 mm.

Although this description has dealt with a preferred application of this filtration system (which is not intended to be limiting), there is a multitude of applications recognized by those skilled in the art. Various changes and modifications may be made without departing from the spirit and scope of the appended claims. As for instance, the filter beds can be arranged for a certain inclination still having a hydraulic cross-flow pattern. Furthermore, the amount and the location of the inlet chamber —filter bed —outlet chamber within a module can be arranged as to different alternatives.

What is claimed is:

1. A granulated filter element for the filtration of a suspension containing pollutants, comprising:
   at least one inlet chamber for containing the suspension;
   an outlet chamber for collecting a filtered solution;
   a filter bed located between the inlet and outlet chambers for filtering the pollutants from the suspension entering the filter bed in a substantially horizontal flow direction from the inlet chamber and directing the filtered solution into the outlet chamber, the filter bed including granular filter media with particle sizes less than about 0.6 mm and a bed depth defined in the flow direction of less than about 12 cm; and
   a filter media washer extending from a bottom portion of the filter bed toward a top portion of the filter bed for washing the granular filter media to remove the pollutants from the granular filter media, the washer having a base communicating with the filter bed at the bottom portion of the filter bed and having a first inlet for introducing a gas into the base and a second inlet for introducing washwater separate from the suspension into the base, the gas and washwater recirculating the granular filter media from the bottom portion of the filter bed to the top portion of the filter bed.

2. The granulated filter according to claim 1, wherein the granular filter media includes granules with a particle range from 0.05 to 0.50 mm and a bed depth of 4 to 10 cms.

3. The granulated filter of claim 1, wherein the washer comprises:
   an air lift pipe extending from the bottom portion of the filter bed and above the top portion of the filter bed, the air lift pipe defining an opening in the base of the washer communicating with the granular filter media, the gas and washwater being introduced into the base to lift the granular filter media upward from the base; and
   a separator above the filter bed for separating the air, washwater and pollutants from the granular filter media and returning the granular filter media to the filter bed.

4. A filter system for the filtration of a suspension containing pollutants, comprising:
   a plurality of filter modules communicating with an inlet conduit for introducing the suspension into the modules and an outlet conduit for directing a filtered solution away from the modules, each module comprising:

at least one inlet chamber for containing the suspension delivered by the inlet conduit;

an outlet chamber for collecting the filtered solution and directing the filtered solution to the outlet conduit;

a filter bed located between the inlet and outlet chambers for filtering pollutants from the suspension entering the filter bed in a substantially horizontal flow direction from the inlet chamber, the filter bed including granular filter media having a particle size less than about 0.6 mm and a bed length in the flow direction of less than about 12 cm; and a filter media washer extending from a bottom portion of the filter bed toward a top portion of the filter bed for washing the granular filter media to remove the pollutants from the granular filter media, the washer having a base communicating with the filter bed at the bottom portion of the filter bed and having a first inlet for introducing a gas into the base and a second inlet for introducing washwater separate from the suspension into the base, the gas and washwater recirculating the granular filter media from the bottom portion of the filter bed to the top portion of the filter bed.

5. The filter system of claim 4, wherein the filter bed is oriented vertically and encased in permeable walls.

6. The filter system according to claim 4, wherein the washer comprises:

an air lift pipe extending from the bottom portion of the filter bed and above the top portion of the filter bed, the air lift pipe defining an opening in the base of the washer communicating with the granular filter media, the gas and washwater being introduced into the base to lift the granular filter media upward from the base; and a separator above the filter bed for separating the air, washwater and pollutants from the granular filter media and returning the granular filter media to the filter bed.

7. The filter system of claim 4, wherein the inlet chamber, outlet chamber and filter bed each define a longitudianl axis perpendicular to the flow direction, the longitudinal axes of the inlet chamber, outlet chamber and filter bed of each module being parallel.

8. A method for filtering a suspension containing pollutants comprising the steps of:

passing the suspension through a filter bed in a substantially horizontal flow direction for filtering the pollutants from the suspension, the filter bed including granular filter media with particle sizes less than about 0.6 mm and a bed depth defined in the flow direction of less than about 12 cm;

interrupting the passage of the suspension through the filter bed, washing the filter media when the suspension is not passing through the filter bed to remove the pollutants from the granular filter media, the filter media being washed in a washer extending from a bottom portion of the filter bed toward a top portion of the filter bed and having a base communicating with the bottom portion of the filter bed, the washing including the steps of introducing a gas into the base and introducing washwater separate from the suspension into the base to recirculate the granular filter media from the bottom portion of the filter bed to the top portion of the filter bed; and separating the air, washwater and pollutants from the granular filter media in a separation zone above the filter bed and returning the granular filter media to the filter bed.

* * * * *